US008452537B2

(12) United States Patent
Havin et al.

(10) Patent No.: US 8,452,537 B2
(45) Date of Patent: *May 28, 2013

(54) SYSTEM AND METHOD FOR PREDICTING TORNADO ACTIVITY (75) Inventors: Matthew Alan Havin, Huntsville, AL (US); Robert J. Dreisewerd, Jr., Huntsville, AL (US); Robert O. Baron, Sr., Huntsville, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/073,956

(22) Filed: Mar. 28, 2011

(65) Prior Publication Data
US 2012/0078836 A1    Mar. 29, 2012

Related U.S. Application Data (63) Continuation of application No. 11/971,968, filed on Jan. 10, 2008, now Pat. No. 7,917,291.

(51) Int. Cl.
*G01W 1/00* (2006.01)
(52) U.S. Cl.
USPC ........................................ 702/3; 702/1; 702/2
(58) Field of Classification Search
USPC .......................................................... 702/1–3
See application file for complete search history.

(56) References Cited

U.S. PATENT DOCUMENTS

| 5,517,193 A * | 5/1996 | Allison et al. ............... 342/26 R |
| 6,125,328 A * | 9/2000 | Baron et al. ....................... 702/3 |
| 6,278,947 B1 * | 8/2001 | Baron et al. ....................... 702/3 |
| 6,401,039 B1 * | 6/2002 | Baron et al. ....................... 702/3 |
| 6,670,908 B2 * | 12/2003 | Wilson et al. ............... 342/26 R |
| 6,751,580 B1 * | 6/2004 | Cope et al. ....................... 703/2 |
| 7,558,674 B1 * | 7/2009 | Neilley et al. ..................... 702/3 |
| 7,917,291 B2 * | 3/2011 | Havin et al. ....................... 702/3 |
| 8,224,768 B1 * | 7/2012 | Crawford et al. ............... 706/62 |
| 2001/0049584 A1 * | 12/2001 | Jones et al. ....................... 702/3 |
| 2001/0052847 A1 * | 12/2001 | Auerbach ..................... 340/540 |
| 2005/0049789 A1 * | 3/2005 | Kelly et al. ....................... 702/3 |
| 2006/0036366 A1 * | 2/2006 | Kelly et al. ....................... 702/3 |
| 2008/0169920 A1 * | 7/2008 | Spence ..................... 340/539.1 |
| 2009/0216860 A1 * | 8/2009 | Li et al. ....................... 709/219 |

* cited by examiner

*Primary Examiner* — Eliseo Ramos Feliciano
*Assistant Examiner* — Yaritza H Perez Bermudez
(74) *Attorney, Agent, or Firm* — Frank M. Caprio; Stephen H. Hall; Bradley Arant Boult Cummings LLP (57) ABSTRACT A system that predicts current tornado activity has been developed. The system includes a processor that receives model data from a meteorological data source that indicates tornadic activity and generates a model data tornado potential index. The processor also receives radar data indicative of tornadic activity and generates a radar data tornado potential index using weighted values assigned to different components of the radar data, where the components of the radar data comprise, a tornado vortex signature (TVS) data value, a mesocyclonic activity (MESO) data value, a precipitation and intensity (dBz) data value, a vertically integrated liquid (VIL) data value, and hail size data value. The processor further generates a composite tornado potential index using weighted values of the model data tornado potential index and the radar data tornado potential index and stores the index in an electronic, data storage media.

6 Claims, 5 Drawing Sheets

SYSTEM AND METHOD FOR PREDICTING TORNADO ACTIVITY

CROSS-REFERENCE TO RELATED APPLICATIONS

This application is a continuation application of U.S. patent application Ser. No. 11/971,968, now U.S. Pat. No. 7,917,291, titled "A System and Method for Predicting Tornado Activity" that was filed on Jan. 10, 2008.

FIELD OF THE INVENTION

The present invention relates generally to a system and method for predicting tornadoes. More specifically, the disclosed system and method relate to predicting tornadoes using radar data, and a combination of forecast models and radar data.

BACKGROUND ART

Tornadoes cause millions of dollars in property damage and kill numerous people every year. Over the past few decades, advances have been made in forecasting areas where potential tornadic activity may develop. Tornado forecasting and detection methods include radar/satellite data and trends, models and surface analysis.

For example, the National Weather Service ("NWS") operates a number of radars scattered throughout the country which provides weather data to subscribers. This series of radars is often referred to as NEXRAD. Subscribers, such as television stations desiring to transmit weather broadcasts, use data from the NEXRAD system to communicate certain information about storm activity.

One aspect of the NEXRAD service is the "NEXRAD ATTRIBUTES". This service provides subscribers with detailed information concerning storms detected at each NEXRAD radar site. The NEXRAD ATTRIBUTE data includes the following information for each storm:

ID: A unique 3-digit identifier

AZ: The direction of the storm in degrees from the radar source

RANGE: The distance of the storm in nautical miles from the radar source

TVS: The presence of a tornado vortex signature ("TVS"), and if so, either a TVS or ETVS (elevated tornado vortex signature)

MESO: The presence of mesocyclonic activity, and if so, the corresponding strength HAIL: The likelihood of hail (percent chance of hail, percent chance of severe hail, and approximate hail size in inches)

DBZM: The maximum DBZ level (a measurement of the precipitation and intensity)

FCST ANGLE: Forecasted movement angle (storm path) in degrees

FCFT MVMT: Forecasted movement speed in nautical miles per hour

A number of prior art patents have disclosed the use of the NEXRAD attributes in projecting predicted storm paths that may include tornadic activity, including U.S. Pat. Nos. 6,125,328, 6,278,947, and 6,401,039.

A number of other U.S. patents have disclosed systems and methods for detecting and displaying windshear, a condition often associated with tornadic activity. Examples of systems and methods for detecting and displaying such windshear are disclosed in U.S. Pat. Nos. 6,163,756, 6,272,433, and 6,356,843. All of these systems provide users the ability to detect and display potential tornadic activity detected by radar (either NEXRAD or privately owned Doppler radars). Additionally, other third-party weather data providers, for example, Baron Services, Inc., also utilize their own proprietary methodologies for detecting dangerous twisting of the wind and rotational activity within a storm based on radar data.

Other radar trends may be analyzed to predict when and where tornadoes may develop, for example, high reflectivity values, increasing storm strength (dBz, VIL, etc.), velocity couplets, or storm cell identification and tracking ("SCIT") vectors. Radar data, and the display of storm conditions which may include tornadic activity derived from the radar data, offer the advantage of real time, or near real time, tracking.

A number of forecast models have also been developed to predict the potential for tornadic development over a particular area. One model used by the National Weather Service, referred to as The Rapid Update Cycle Model ("RUC"), generates a large amount of data that can be used to predict the potential for tornadic activity.

One indicator of potential tornadic activity generated by RUC is convective available potential energy ("CAPE"). CAPE data is essentially an instability index generated by the RUC. Generally, it is the amount of energy a parcel of air would have if lifted a certain distance vertically through the atmosphere. Higher numbers show more unstable and explosive environment for thunderstorms. One specific CAPE measurement is Surface-Based CAPE (J/Kg). Surface-Based CAPE is a measure of instability in the troposphere. This value represents the total amount of potential energy available to a parcel of air originating at the surface and being lifted to its level of free convection (LFC). No parcel entrainment is considered. The CAPE and CIN (discussed below) calculations use the virtual temperature correction known in the art.

CIN (Convective Inhibition) represents the "negative" area on a sounding that must be overcome before storm initiation can occur. Stated another way, CIN indicates the amount of energy that will prevent an air parcel from rising from the surface to the level of free convection. CIN is measured in negative numbers. The lower the value (−200 v. −100), then the less chance that thunderstorms are able to develop in that environment.

The higher the CAPE, the greater possibility for tornado activity. The values for CAPE often range from 0 up to approximately 8,000, with most thunderstorms registering a CAPE of between 1,000 and 4,000. It should be noted, however, that a CAPE over approximately 4,000 to 5,000 does not always result in a greater potential for tornadic activity because such a system may have too much energy and will deteriorate before a tornado is able to organize.

Another data product generated using the RUC model is storm relative helicity (SRH). SRH is a measure of the potential for cyclonic updraft rotation in right-moving supercells, and is often calculated for the lowest 1-km and 3-km layers above ground level. There is no clear threshold value for SRH when forecasting supercells, since the formation of supercells appears to be related more strongly to the deeper layer vertical shear. Larger values of 0-3-km SRH (greater than 250 m2/s2) and 0-1-km SRH (greater than 100 m2/s2), however, do suggest an increased threat of tornadoes with supercells. For SRH, larger values are generally better, but there are no clear "boundaries" between non-tornadic and significant tornadic supercells. SRH is a mathematical formula used to determine shear, and the higher the SRH, the better chance for rotation within a storm, and thus, tornadic activity. SRH values often range from 0 to over 1,000, but normally range from 0 to 500. Helicity generally measures the transfer of vorticity from the environment to an air parcel in convective motion, i.e., it shows how much shear there is in a given environment. Theoretically, higher helicity=higher shear, rotation, and turning of the atmosphere which is conductive for tornadoes.

An additional data product generated by RUC, or from data available from RUC, is the Lifting Condensation Level ("LCL"). LCL is the level at which a parcel becomes saturated. It is a reasonable estimate of cloud base height when parcels experience forced ascent. Generally, the lower the clouds, the better chance to have tornadic activity on the ground, and, thus, affect individuals and property. LCL values often range from approximately 400 to 4,000 meters. When LCL levels increase over approximately 2,000, the chances of tornadic activity on the ground are significantly decreased.

Other models disclose the moisture levels in specific areas, with areas of higher moisture, up to a certain point, the more likely to promote tornado development.

The RUC model provided by the National Weather Service is currently generated approximately once an hour, although once the data is actually provided to users, it is approximately one hour old. Thus, for the RUC model generated at 10:00 a.m., it may not be available for distribution until 11:00 a.m. The RUC model also provides forecasting data out at one hour intervals, with some RUC model data periodically available forecasted out six hours. For example, the RUC model generated at 10:00 a.m., would have data related to the current conditions at 10:00 a.m. (although not available until 11:00 a.m.), and forecasted conditions at 11:00 a.m., 12:00 p.m., and 1:00 p.m. (all not currently available until 11:00 a.m.). Although the foregoing discussion relates to the generation of CAPE, SRH, and LCL using the RUC model, other models are known in the art to generate similar values and can be used in accordance with the invention disclosed herein.

The RUC data may be downloaded from the National Centers For Environmental Prediction ("NCEP"). The information can be downloaded, and decoded to extract the information that may be of use, for example, the CAPE data, SRH data, LCL data, etc. If other models are used to generate similar data, they can either be directly input into the system or downloaded and decoded similar to the RUC model data.

In some instances, various RUC data products, or similar products from other Numerical Weather Prediction models, can be combined for tornado prediction. For example, the Storm Prediction Center of the National Weather Service utilizes an algorithm entitled "Significant Tornado Parameter" ("STP"). STP is a multiple ingredient, composite index that includes 0-6 km bulk wind difference (6BWD), 0-1 km storm-relative helicity (SRH1), surface parcel CAPE (sbCAPE), surface parcel CIN (sbCIN), and surface parcel LCL height (sbLCL). This version of STP uses fixed layer calculations of vertical shear, and the surface lifted parcels, as an alternative to the "effective layer" version of STP.

The index is formulated as follows:

$$STP = (sbCAPE/1500 \text{ J kg}^{-1}) * ((2000-sbLCL)/1500 \text{ m}) * (SRH1/100 \text{ m}^2\text{s}^{-2}) * (6BWD/20 \text{ m s}^{-1}) * ((200+sbCIN)/150 \text{ J kg}^{-1})$$

When the sbLCL is less than 1000 m AGL, the sbLCL term is set to one, and when the sbCIN is greater than −50 J kg−1, the sbCIN term is set to one. Lastly, the 6BWD term is capped at a value of 1.5, and set to zero when 6BWD is less than 12.5 m s−1. A majority of significant tornadoes (F2 or greater damage) have been associated with STP values greater than 1, while most non-tornadic supercells have been associated with values less than 1 in a large sample of RUC analysis proximity soundings.

The result of the STP is a composite model forecast of potential tornadic activity in various places across the United States. Most tornadic activity is located where the model forecast value is over one.

For most of the data products generated from RUC model data, including CAPE, SRH, LCL, and the STP, individual values are assigned to individual cells. The area of geographical interest, the continental United States in the case of the RUC, is divided into approximately 13 kilometers by 13 kilometers cells covering the United States. Thus, each individual cell will have a corresponding CAPE value, SRH value, LCL value, STP value, etc. These cells may have values according to the 10:00 forecast, 11:00 forecast, 12:00 forecast, etc. The relative size of the cells is not a limitation and different size cells can be used.

Other tornado forecasting and detection methods analyze the location and orientation of surface features, for example, strong surface lows, fronts (cold and warm), drylines, and triple points (if evident), for defining areas of strong tornado potential.

While forecast models are helpful in predicting areas of essential tornadic activity, forecast models do not take into account actual or possible tornadic activity being detected by local radars. Additionally, model data alone may indicate tornadic potential in areas that often never develop supercells due to capping or a lack of a mechanism to provide necessary forcing (front, dryline, etc.). Similarly, local radar activity may detect some evidence of tornadic activity, but it does not take into account other factors which might affect the development of tornadic activity accounted for in many of the statistical models. Moreover, radar data alone may have a hook echo or a strong velocity couplet which are associated with tornadoes, but may never produce a tornado due to a poor environment (for example, high LCL).

Additionally, during a tornado outbreak, a meteorologist may not have the time to analyze all of the available forecast model data and radar information together. Examples of data commonly missed include, a supercell moving well ahead of warm front (often having rapidly decreasing CAPE and tornado threat), presence of high LCL>2000 m (greatly decreasing tornado threat), rapidly increasing mesoscale environment south of current tornadic "action area" (thus missing even stronger storms), and marginal radar returns but quickly-spotted tornado (mesoscale potential strong at time). Thus, a system and method combining the advantages of surface models, forecasting models, and radar is needed.

SUMMARY OF THE INVENTION

In some aspects, the invention relates to a system that predicts current tornado activity comprising: a processor that receives model data from a meteorological data source that indicates tornadic activity and generates a model data tornado potential index; where the processor receives radar data indicative of tornadic activity and generates a radar data tornado potential index using weighted values assigned to different components of the radar data, where the components of the radar data comprise, a tornado vortex signature (TVS) data value, a mesocyclonic activity (MESO) data value, a precipitation and intensity (dBz) data value, a vertically integrated liquid (VIL) data value, and hail size data value; where the processor generates a composite tornado potential index using weighted values of the model data tornado potential index and the radar data tornado potential index; and an electronic data storage media that stores the composite tornado potential index.

In other aspects, the invention relates to a system that predicts current tornado activity comprising: means for generating a model data tornado potential index based on meteorological model data that indicates tornadic activity; means for generating radar data tornado potential index based on radar data indicative of tornadic activity, where the components of the radar data comprise, a tornado vortex signature (TVS) data value, a mesocyclonic activity (MESO) data value, a precipitation and intensity (dBz) data value, a vertically integrated liquid (VIL) data value, and hail size data value; means for generating a composite tornado potential index based on the model data tornado potential index and the radar data tornado potential index; and means for overlaying the composite tornado potential index on a map.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

The various embodiments of the present invention and their advantages are best understood by referring to FIGS. 1 through 5 of the drawings. The elements of the drawings are not necessarily to scale, emphasis instead being placed upon clearly illustrating the principles of the invention. Throughout the drawings, like numerals are used for like and corresponding parts of the various drawings.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

With this in mind, this invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1:
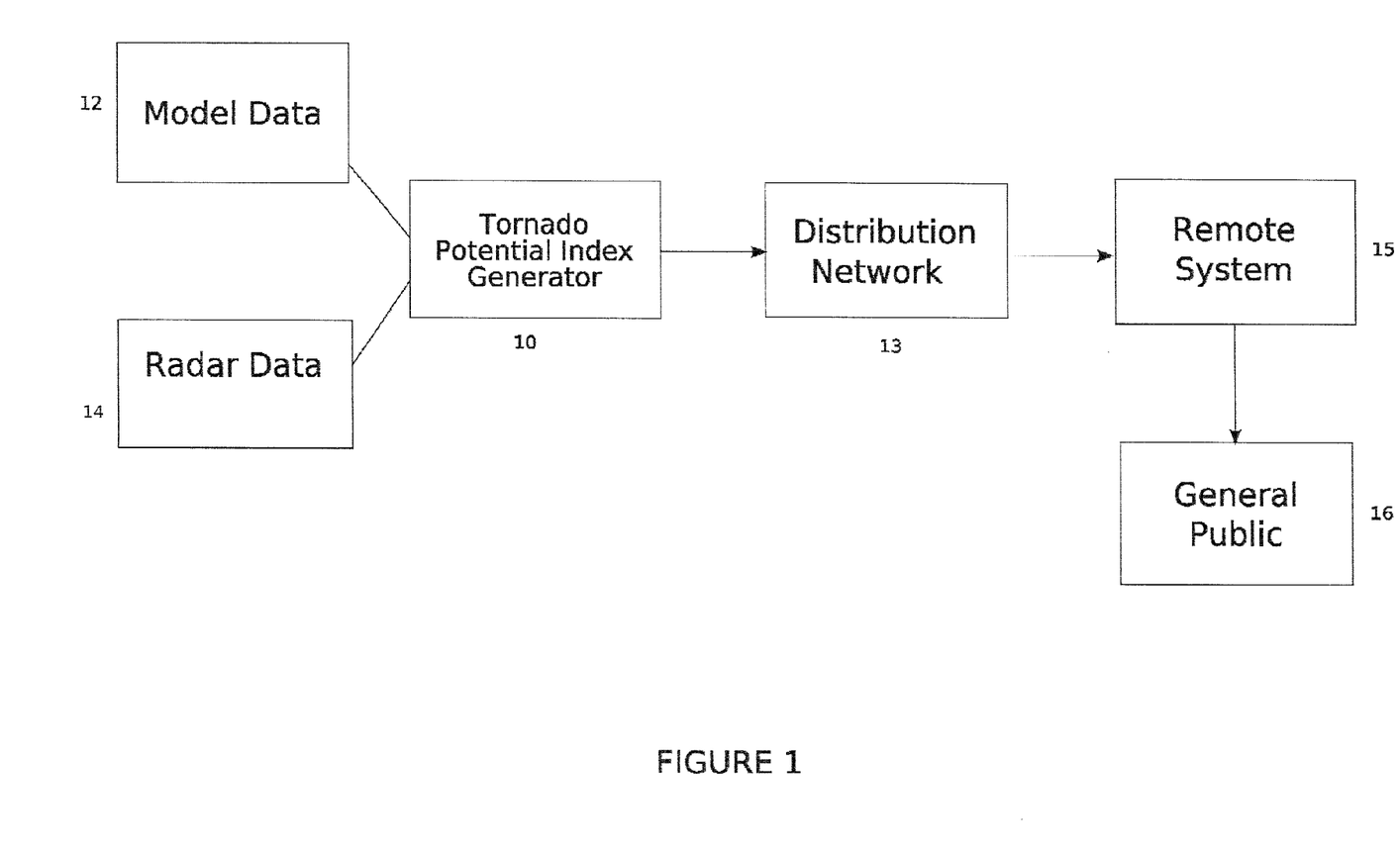
FIG. 1 is a functional diagram of the overall system architecture according to an embodiment of the present invention.

Referring now to FIG. 1, one embodiment of the system for predicting tornadic activity in accordance with the present invention is illustrated. The system comprises a tornado potential index generator 10 in communication with distribution network 13. In turn, distribution network 13 is in communication with one or more remote systems 15. Tornado potential index generator 10 receives forecast model data 12 and radar data 14, for a geographic area which is relevant to one or more of the remote systems 15. The model data 12 may be provided from RUC from the National Weather Service, or other model data sources. The model data could also be generated on-site using proprietary algorithms. The model data 12 contains one or more tornado indicator data, i.e., data that is indicative of potential tornado activity. Examples of tornado indicator data from model data, or derived from model data, include, but are not limited to, CAPE, CIN, helicity, LCL, and wind differences.

The radar data 14 may be from the NEXRAD attributes from the National Weather Service, other data from the National Weather Service, or from local Doppler radars. The radar data 14 contains one or more tornado indicator data. Examples of tornado indicator data from radar data, or derived from radar data, include, but are not limited to, TVS, MESO, dBz, VIL, hail (for example, from NWS), and shear markers (for example, from private third parties).

The model data 12 and radar data 14 are processed by the tornado potential index generator 10 to construct a tornado potential index ("TPI"), which is a compilation of interpreted weather conditions, and transmit the resulting data to one or more remote systems 15 over distribution network 13. As discussed further below, the TPI is preferably formatted into a matrix or grid structure, comprising a number of cells, with each cell preferably being assigned a number corresponding to the TPI. Remote systems 15 process the received TPI information, and can display the TPI information on a geographical map. This display can be broadcast to the general public 16, for example, as part of a weather broadcast for a television station.

If the tornado potential index generator 10 is located in the same location as the remote system 15, no distribution network 13 is needed. This alternative embodiment may be used, for example, if the tornado potential index generator 10 is located at a television station.

Figure 2:
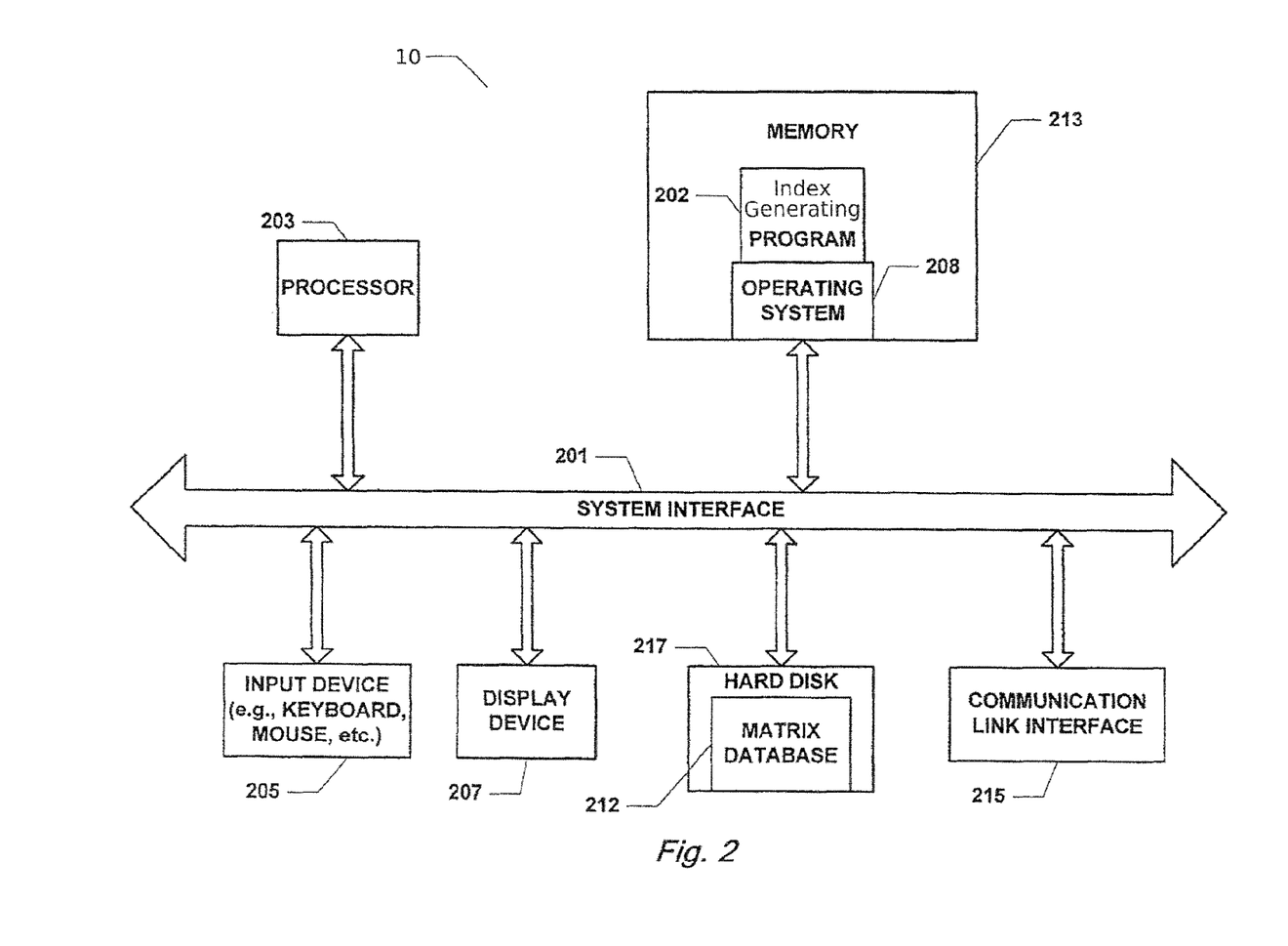
FIG. 2 is a functional diagram of the tornado potential index generator according to an embodiment of the present invention.

An illustration of an exemplary tornado potential index generator 10 is provided by the functional diagram of FIG. 2. Exemplary tornado potential index generator 10 includes index generating program 202 in accordance with the present invention. As shown, the tornado potential index generator 10 is preferably configured as a special purpose computer or other apparatus suitable for executing the program code embodied within the index generating program 202 so as to impart the functionality described herein and those other functionalities necessary for the operation of the present invention as would be apparent to one of ordinary skill in the art. The tornado potential index generator 10 further includes a processor 203 that can communicate with the other elements within the tornado potential index generator 10 via system interface 201. An input device 205, for example, a keyboard or mouse, is used to input data from a user, and a screen display device 207, for example, a monitor, is used to output data to the user. A memory 213 within the tornado potential index generator 10 contains the index generating program 202 for imparting the functions described herein. In addition, the memory 213 includes a conventional operating system 208 that communicates with the index generating program 202 and enables execution of the index generating program 202 by the processor 203. A communication link interface 215 is provided for interfacing the tornado potential index generator 10 with other related systems for purposes such as receiving meteorological data (i.e., the model data 12 or radar data 14), or transmitting data to the distribution network 13. Lastly, a hard disk 217 may be provided as a nonvolatile memory for storing information such as a matrix database 212 as described in more detail below. It will be appreciated by those skilled in the art that tornado potential index generator 10 may be also achieved by using a cluster of two or more computers in communication, as may be necessary to handle the data.

Tornado potential index generator 10 is configured to receive meteorological data (i.e., the model data 12 or radar data 14) via communication link interface 215, or alternatively, via manual input through input device 205. Some non-limiting examples of meteorological data sources include, the National Oceanic & Atmospheric Administration (NOAA) via its NOAAport, National Weather Service (NWS), National Lightning Detection Network, local Doppler radars, NEXRAD radars, National Digital Forecast Database, Flash Flood Guidance Grid, local, ground based sensors, the Rapid Update Cycle (RUC) model available from the National Centers for Environmental Prediction (NCEP), and other Numerical Weather Prediction Models available from either the National Centers for Environmental Prediction ("NCEP") or private companies. Meteorological data can also be obtained from private third party weather providers utilizing their own meteorological processing systems, for example, Baron Services, Inc. These data are available over an electronic communications network using suitable transfer protocols, e.g., file transfer protocol, or the like, and may be automatically retrieved by tornado potential index generator 10 which is configured with control logic to cause the tornado potential index generator 10 to execute that function. Alternatively, other processors may be configured with control logic to retrieve the required data, collate the data into a format and transfer that data to the tornado potential index generator 10. The tornado potential index generator 10 is preferably adaptable to accept and process data in whatever format may be available from any source of meteorological data, currently existing or hereafter developed.

Figure 3:
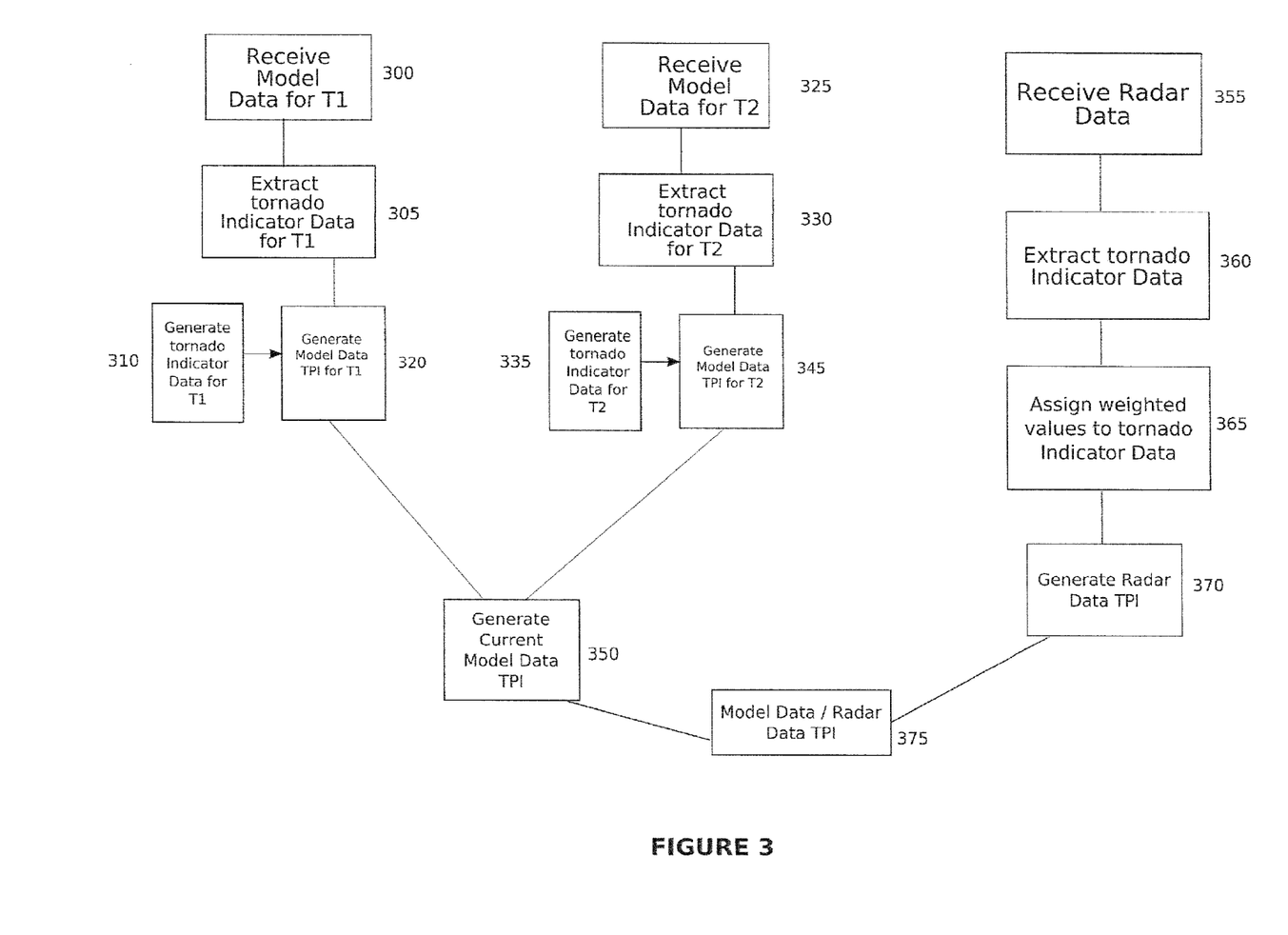
FIG. 3 is a flowchart illustrating an exemplary method used by the invention.

In one embodiment, shown in steps 300 through 320 of FIG. 3, the present system and method creates a tornado potential index ("TPI") based on various forecast model data. In this embodiment, in step 300, model data 12 is received from a model data source. In step 305, selected tornado indicator data is extracted from the data stream. In this embodiment, CAPE data, Helicity data (surface—1 km above ground) and CIN data can be extracted directly from the RUC model data stream, or other data source. In the preferred embodiment, each geographic cell (for example, 13 km×13 km) has a corresponding value for various time periods, for example, 10:00 am, 11:00 am, 12:00 pm, etc. Steps 300 through 320 represent the process for one time period, i.e., T1. Similar steps 325 through 345 represent the process for a second time period, i.e., T2.

In step 310, any tornado indicator data is that is not available directly from the model data 12, is generated. For example, a wind difference value may also be generated for each geographic cell, and for each time period. In one embodiment the 475 mb winds and the surface winds generated by the RUC model are downloaded and a wind difference (in knots) is generated according to the following formula:

$$\text{Wind difference} = (475\ mb\ winds) - (surface\ winds)$$

Wind differences may be calculated using measurements other than 475 mb and surface.

An LCL estimate, another example of tornado indicator data, may also be generated. In one embodiment the following information generated by the RUC model are extracted from the data stream:

(a) pressure at the surface
(b) HGT (geopotential height for surface)
(c) temperatures from surface to 30 mb (TMP_30_0)
(d) temperatures from 60 mb to 30 mb (TMP_60_30)
(e) temperatures from 90 mb to 60 mb (TMP_90_60)
(f) relative humidity from surface to 30 mb (RH_30_0)
(g) relative humidity from 60 mb to 30 mb (RH_60_30)
(h) relative humidity from 90 mb to 60 mb (RH_90_60)

A temperature average between the surface and 90 mb above ground (in Celcius) can be generated according to the following:

$$TMP\_average = (TMP\_30\_0 + TMP\_60\_30 + TMP\_90\_60)/3 - 273.15$$

A relative humidity average between the surface and 90 mb above ground (in Celcius) can be generated according to the following:

$$RH\_average = (RH\_30\_0 + RH\_60\_30 + RH\_90\_60)/3 - 273.15$$

A saturation vapor pressure can be calculated using the Arden Buck equation.

$$\text{Saturation vapor pressure} = (6.1121 * \exp(((18.678 - TMP\_avg/234.5) * TMP\_avg)/(257.14 + TMP\_avg)))/10$$

Vapor pressure and dewpoints can similarly be calculated according to the following:

$$\text{Vapor pressure} = (RH\_avg * \text{Saturation vapor pressure})/100$$

$$\text{Dewpoint} = (241.88 * \log(\text{vapor pressure}/0.61078)/(17.558 - \log(\text{vapor pressure}/0.61078))$$

Then, the LCL, in mb, above sea level ("ASL") can be calculated according the following:

$$LCL\_ASL = (1/((((TMP\_avg - dewpoint)/(233.15)) + 1)^{\wedge}3.5))* (pressure/100)$$

The LCL (ASL) can then be converted to LCL above ground level ("AGL") according to the following:

$$LCL\_AGL = ((1013.25 - LCL\_ASL) * 10.68) - HGT + 400$$

HGT represents the height (elevation) at the surface of the grid cell in the RUC model. In one embodiment, LCL is minimally limited to 400 meters. If below 400 meters, then location is set to =400 meters. LCL estimates can be calculated using other LCL estimate equations known in the art.

With values for CAPE, helicity (surface to 1 km above ground), CIN, Wind difference, and an LCL estimate either collected or generated, a model data TPI can be generated. Applicant has found that a composite data product derived from two or more of these individual model data products provide superior forecasting for potential tornadic activity.

Tornado Potential Index Based on Forecast Model Data

In one embodiment, values for CAPE, helicity (surface to 1 km above ground), CIN, Wind difference, and an LCL estimate are combined to create a model data tornado potential index ("TPI") for each cell. The process is preferably run for 1 hour and 2 hour RUC forecast files due to the time lag for receiving the information. As described below, model data TPI for T1 and T2 may be combined in step 350 to create a "current" model data TPI. In the preferred embodiment, depicted as step 320 in FIG. 3, the model data TPI is prepared for at least the two time periods (T1 and T2) according to the following:

Model Data *TPI* mesoscale(variable)=(CAPE/1500)*
((2000−*LCL*)/1500)*(*HLCY*/100)*(*WD*/20)*
((200+*CIN*)/150)

In this embodiment, the (WD/20) value is capped at 1.5, and the ((200+CIN)/150) value is capped at 1. The numbers used to derive the model data TPI mesoscale figure (i.e., dividing CAPE by 1500, HLCY by 100, etc.) may be modified. Applicant, however, has found this formula to be useful and accurate.

If Model Data TPI_mesoscale(variable)>=1, then Model Data TPI mesoscale=(Model Data TPI_mesoscale(variable)−1)*2. Otherwise, if Model Data TPI_mesoscale(variable)<1, then Model Data TPI mesoscale=0.

In this embodiment, Model Data TPI mesoscale capped at 10. The Model Data TPI value is representative of the likelihood of tornadic activity based on the model data. The higher the value, the more likely to have tornadic activity. For example, a value of 0 indicates a very low likelihood of tornadic activity. A value of 10 indicates a very high likelihood of tornadic activity.

For reasons outlined further below, the Model Data TPI will often be calculated for two or more different time periods. For example, the system may calculate Model Data TPI for the 10:00 forecast data, 11:00 forecast data, 12:00 forecast data, etc.

Figure 4:
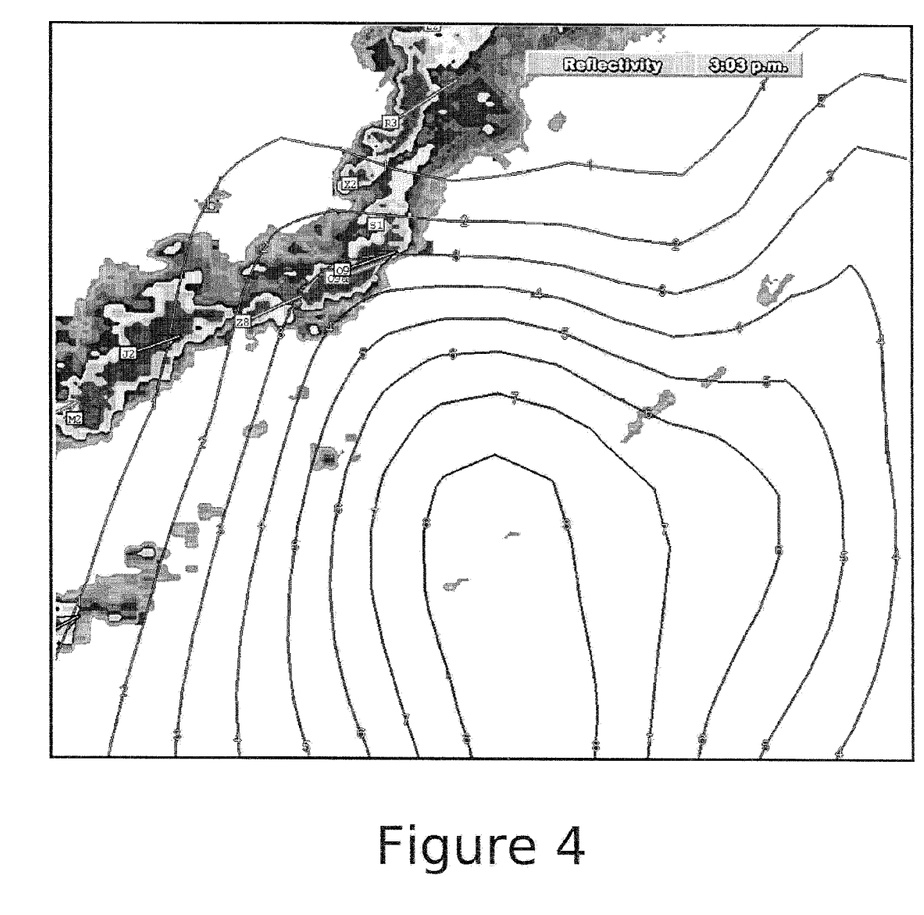
FIG. 4 is one embodiment depicting the model data tornado potential index overlaid with the current radar reflectivity.

The Model Data TPI can be depicted to meteorologists via a computer display and subsequently broadcast to the general public. It will normally have the Model Data TPI overlayed on a geographic map. The geographic map may have state lines, county lines, roads, lakes, streams, cities, and other areas of interest. In one embodiment, the Model Data TPI is displayed as contours showing the areas with a Model Data TPI of 1, 2, 3, etc. FIG. 4 shows one such embodiment along with radar reflectivity and embedded SCIT information. The Model Data TPI can also be displayed using different colors to depict different levels.

Model Data TPI can be calculated using less than the five RUC data outlined above. In that case, different weighted values can be given to the data actually used. Additionally, different RUC data, or data from other sources may also be used. The Model Data TPI is simply a base index number for potential tornadic activity derived from forecast model data.

Tornado Potential Index Based on Radar Data

In one embodiment, the present system and method creates an index indicative of tornado potential based on radar data. In this embodiment, in step 355 of FIG. 3, radar data 14 is received from a radar data source. In step 360, selected tornado indicator data is extracted from the data stream. In step 365, weighted values are assigned to the tornado indicator data. In step 370, a radar data based TPI is generated. As described further below, this may be used independently, or in conjunction with model data TPI.

In one embodiment, the radar data comprises storm cell identification and tracking ("SCIT") information from the National Weather Service. It will be recognized by those of skill in the art that similar "SCIT" type information derived from private third-party weather providers can also be used to create similar indexes derived from radar data. In the embodiment utilizing NWS SCIT information, the following tornado indicator data is preferably extracted for use in creating the radar data TPI: TVS, MESO, dBz, VIL, and Hail size. TVS, MESO, dBz, VIL, and Hail size are then provided weighted values (step 365) as explained further below.

The presence of TVS detected by a NWS SCIT is highly indicative of potential tornadic activity. However, when only ETVS is indicated, there is a less likelihood of tornadic activity than when just TVS is indicated. Thus, in allocating "weight" to the various alternative "TVS" information from the SCIT, Applicant's preferred embodiment uses the following:
  a) If SCIT information indicates TVS, then the "TVS value"=100
  b) If SCIT information indicates ETVS, then the "TVS value"=70
  c) If SCIT information indicates no TVS or ETVS, then "TVS value"=0

The presence of MESO detected by a NWS SCIT is indicative of potential tornadic activity. The higher the MESO value, the more likely to have tornadic activity. Thus, in allocating "weight" to the various "MESO" information from the SCIT, Applicant's preferred embodiment uses the following:
  a) If SCIT information indicates MESO>=5, then "MESO value"=100
  b) If SCIT information indicates MESO=4, then "MESO value"=90
  c) If SCIT information indicates MESO=3, then "MESO value"=80
  d) If SCIT information indicates MESO=2, then "MESO value"=60
  e) If SCIT information indicates MESO=1, then "MESO value"=40
  f) If SLIT information indicates no MESO, then "MESO value"=0

The presence of high dBz may be indicative of potential tornadic activity. The higher the dBz, the more likely to have tornadic activity. Thus, in allocating "weight" to the various dBz information, Applicant's preferred embodiment uses the following: "dBz value"=100−(4*(60−SCIT dBz information)). dBz value is capped at 100.

The presence of high VIL may be indicative of potential tornadic activity. The higher the VIL, the more likely to have tornadic activity. Thus, in allocating "weight" to the various VIL information, Applicant's preferred embodiment uses the following: "VIL value"=100−(2*(50−SCIT VIL information)). VIL value is capped at 100.

The presence of hail may be indicative of potential tornadic activity. The larger the hail size, the more likely to have tornadic activity. Thus, in allocating "weight" to the various hail information, Applicant's preferred embodiment uses the following:
  a) If SCIT information indicates hail size>=0.25, then "hail size value"=20
  b) If SCIT information indicates hail size>=0.50, then "hail size value"=40
  c) If SCIT information indicates hail size>=0.75, then "hail size value"=60
  d) If SCIT information indicates hail size>=1.00, then "hail size value"=70
  e) If SCIT information indicates hail size>=1.25, then "hail size value"=80
  f) If SCIT information indicates hail size>=1.50, then "hail size value"=90
  f) If SCIT information indicates hail size>=2.00, then "hail size value"=100

Based on the foregoing TVS value, MESO value, dBz value, VIL value, and hail size value, a first type of radar data TPI can be derived using weighted averages of the various components. Applicant's preferred embodiment ascribes the highest weight to the TVS value (i.e., it is the best indicator of potential tornadic activity), and in descending weight order, MESO value, dBz value, VIL value, and hail size value. In one embodiment (step 370):

Radar data derived $TPI=(0.4)(TVS$ value$)+(0.3)$ $(MESO$ value$)+(0.15)(dBz$ value$)+(0.1)(VIL$ value$)+(0.05)$(hail size value)

The radar data derived TPI in this embodiment is between 0-100.

All of these variables are not required, and different weighted averages could be used, both in generating the TVS value, MESO value, dBz value, VIL value, and hail size value, or in generating the radar derived TPI. For example, the use of VIL could be eliminated and its "weight" attributed to another variable. Alternatively, a higher weighted average could be ascribed to the TVS and/or MESO variables. Additionally, for example, the system could be configured that if the SCIT indicates hail size of greater than 1, the hail size value could be given a value of 100.

The SCIT data will normally provide some type of location information. For example, the NWS SCIT data includes the range and azimuth of the storm from the radar site, a known location. Using simple mathematical calculations, the range and azimuth can be converted to latitude/longitude coordinates, or any other type of coordinate systems used and known in the art. Once the location of the storm is known, it can be associated with the same "cell" as used in the forecast model data described above. Thus, the radar data TPI can be assigned to the appropriate cell. Alternatively, the radar data, and radar data TPI, can be allocated to a different cell configuration than that of the model data (for example, smaller cells) and the model forecast data could be associated with the radar data cells. If there is no radar data information for a cell, it will either have a corresponding radar data derived TPI of 0, or no value at all.

In another embodiment, the radar data TPI derived from the NWS SCITs can be further supplemented and processed with additional information derived from other radar information. For example, some third party meteorological systems generate their own SCITS, and SCIT-related information, based on proprietary algorithms, either from NEXRAD data or from local Doppler radar information. Additionally, supplemental NEXRAD radar information related to gate to gate shear for various radar "tilts" is also available (NEXRAD Level II data). Specifically, the NWS makes information available for gate to gate shear at a first "tilt", or the lowest "tilt" of the atmosphere, with additional gate to gate shear information derived for "tilts" 2-4, i.e., higher sections of the atmosphere. Use of this data may be helpful as it is sometimes more current or more accurate than the basic NEXRAD attributes NWS information. Thus, Doppler radar information, or additional NEXRAD radar information, may be used in conjunction with the NWS NEXRAD attributes information. In one embodiment, it can be utilized as follows:

a) If 50 knts gate to gate shear at tilt 1, plus 30 knts gate to gate shear at tilt 2, then "updated SCIT value"=100
b) If 50 knts gate to gate shear at tilts 2-4, then "updated SCIT value"=50
c) If neither (a) or (b), then "updated SCIT value"=0

In this embodiment, the radar data derived TPI with NEXRAD enhancements=(0.8)(radar data derived TPI)+(0.2)(updated SCIT value). Again, the value is between 0-100.

In another embodiment, the NEXRAD attributes information is not used to derive a TPI, but rather only radar information from a local Doppler radar is used. Most local Doppler radars, and supporting software, will be able to generate information similar to that used in connection with the NEXRAD radars, and corresponding TPI values generated.

In another embodiment, the radar data derived TPI can be allocated to numerous cells. This may be desired because the storm location data provided by the SCIT information may identify the storm to a specific cell. However, storms are not a single "point" and, depending on its size, may cover multiple cells (i.e., those cells delineated by the model data). Thus, for example, a radar data derived TPI for a single cell, could be assigned to all of the surrounding cells that do not have any applicable radar data automatically, or at the request of a user. Alternatively, if two neighboring cells each have a radar data derived TPI, the higher index value could be assigned to both cells.

In another embodiment, the forecast speed and direction of a particular storm can be used to calculate radar data derived TPI for cells in which a storm is not presently located, but may affect in the near future. For example, a SCIT may indicate that a particular storm is currently in a cell (cell #1), but is likely to cross into a neighboring cell (cell #2) within the next five minutes. If cell #2 does not have any radar data corresponding to it, it may have an artificially low radar data derived TPI. Thus, based on the projected speed and/or direction of the storm, the radar data derived TPI for cell #1 can be assigned to cell #2, either automatically, or by user input. This can be done for all cells which are expected to be impacted by the storm. Using the SCIT information to project the future location of storms is well known in the art, including U.S. Pat. Nos. 6,125,328, 6,278,947, and 6,401,039.

Radar data TPI can be used and displayed independently. It provides an easy to understand display of potential tornadic activity based solely on radar data. As with the other TPI indexes discussed herein, it can be displayed on a map using color codes to designate the various threat levels. As discussed below, it may also be combined with model data to create an enhanced product.

Tornado Potential Based on Composite Model Data/Radar Data

In another embodiment, a composite model data/radar data tornado potential index ("MD/RD TPI") is created. The process is preferably run for 1 hour and 2 hour RUC forecast files. In one embodiment:

If model data TPI_mesoscale=0, then, as depicted as step 375 of FIG. 3, MD/RD TPI=(radar data derived TPI)/2, or (radar data derived TPI with NEXRAD enhancements)/2, depending on which embodiment is used.

The time weighted average for the model data TPI_mesoscale may also be used. One way to determine the current model data TPI (step 350 in FIG. 3) is according to the following:

Current Model Data $TPI=(1-\text{current\_minute}/60)*$ (Model Data $TPI$ for past hour) $+$(current_ minute/60)*(Model Data $TPI$ for next hour).

Thus, for Model Data TPI at 10:45 am, (0.25*Model Data TPI at 10:00 am)+(0.75* Model Data at 11:00 am). The "current" data can be calculated in the fashion for the various components of the various models as well. For example, the "current" CAPE, CIN, etc. could be similarly determined using a similar formula.

If Current Model Data TPI>0, as depicted as step 375 of FIG. 3, MD/RD TPI=(0.7)(radar data derived TPI)+(0.3)(Current Model data TPI). Again, the radar data TPI with NEXRAD enhancements could also be used. Also, different weighted averages can be used. For example, the Model Data TPI could be given a higher weight.

Figure 5:
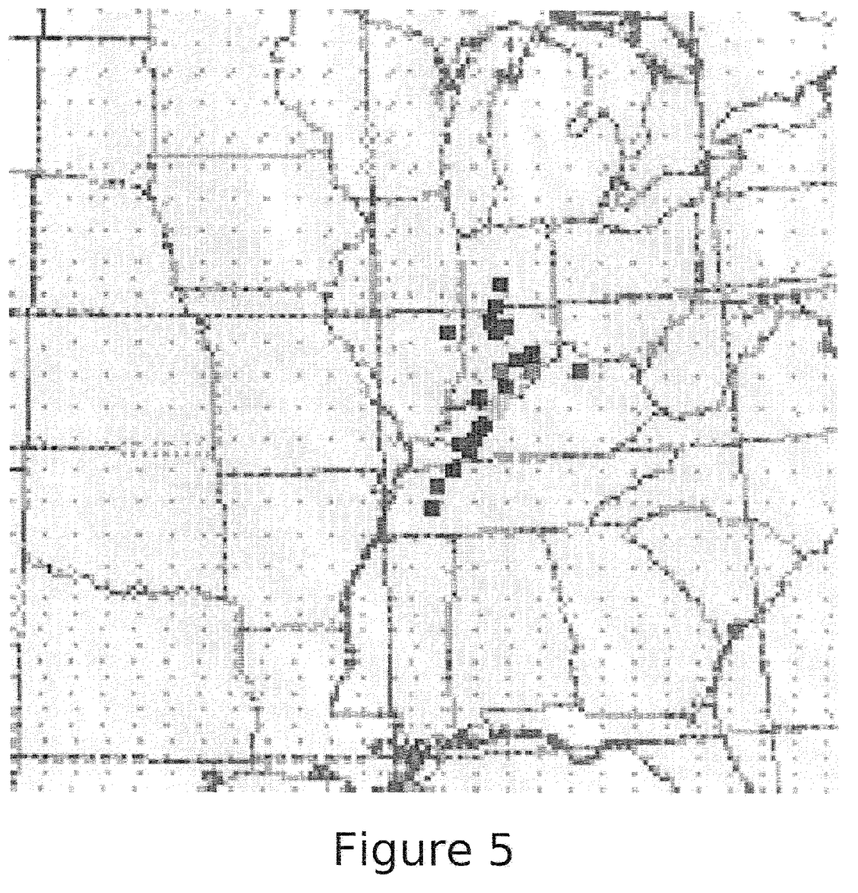
FIG. 5 depicts one embodiment of the model data/radar data tornado potential index.

The MD/RD TPI can be displayed to meteorologists, storm forecasters, and the viewing public. In one embodiment, different MD/RD TPI values can be displayed using different colors or shading, perhaps similar to that used to depict rainfall intensity. For example, MD/RD TPI value of 0 may have no shading, with 1 using a first color, 2 using a second color, 3 using a third color, etc. Alternatively, the MD/RD TPI values may just be broken down into tiers, for example, high risk, moderate risk, low risk, and no risk. One example of this embodiment is depicted in FIG. 5, with light shades representing low risk, darker shades representing moderate risk, and the darkest shade representing the highest risk. MD/RD TPI values may be depicted by themselves, or together with radar reflectivity or other data. High MD/RD TPI values (for example 9 or 10) will normally indicate that a tornado is likely, if not already occurring, and the public should be informed accordingly. Multiple radar scans in succession of a storm with a MD/RD TPI value of 9 or 10 often indicates a rapidly increasing odds that a possible long-track tornado has developed.

Radar data derived TPI values can also be displayed independently without combining it with the model data in a similar fashion.

Other indicators can be used to denote locations with high MD/RD TPI values or high radar data derived TPI values, for example highlighted icons, rotating cylinders, depictions of tornadoes, etc. SCITs can also be displayed showing the projected movement and/or speed of a particular storm. Moreover, the system may also use traditional storm tracking methods in connection with the MD/RD TPI values or high radar data derived TPI values to predict the areas to be affected by the storms, including the systems and methods set forth in U.S. Pat. Nos. 6,125,328, 6,278,947, and 6,401,039.

The MD/RD TN information can also be used with other existing tornado indicators. For example, some meteorological systems will display areas where radar data has detected rotation with a ring or rotating cylinder. One color may be used to depict low level shear, while another color may be used to depict higher level shear (i.e., higher in the atmosphere). In these situations, the MD/RD TPI can be used in conjunction with these types of rings (or other indicators). In one embodiment, the ring may be filled with another color representative of the MD/RD TPI. For example, a radar may detect shear, and place a ring at the location, but the ring might be filled with a color associated with a low MD/RD TPI. In this situation, the meteorologist would know that the actual tornado threat is relatively small. In this way, the meteorologist gets to see the radar data displayed, but has additional information that he or she can communicate with his viewer that he or she might not have time to analyze otherwise.

The MD/RD TPI will allow forecasters and meteorologists the ability to quickly assess the possible tornado threats for an area. The usefulness of the MD/RD TPI increases during the worst severe weather outbreaks. It will highlight the strongest supercell with tornadoes likely on days when multiple storms may become supercells and must be analyzed. It compiles the most relevant information related to tornado development and easily and simply presents that to the user and viewers.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A system that predicts current tornado activity comprising:
   a. a processor that receives model data from a meteorological data source that indicates tornadic activity and generates a model data tornado potential index, where the model data comprises a plurality of tornado indicator data, and where the model data tornado potential index is generated by combining weighted values for selected tornado indicator data;
   b. where the processor receives radar data indicative of tornadic activity and generates a radar data tornado potential index using weighted values assigned to different components of the radar data, where the components of said radar data comprise, a tornado vortex signature (TVS) data value, a mesocyclonic activity (MESO) data value, a precipitation and intensity (dBz) data value, a vertically integrated liquid (VIL) data value, and hail size data value;
   c. where the processor generates a composite tornado potential index using weighted values of the model data tornado potential index and the radar data tornado potential index; and
   d. an electronic data storage media that stores the composite tornado potential index.

2. The computer system of claim 1 where the selected tornado indicator data comprises, convective available potential energy (CAPE), Convective Inhibition (CIN) helicity data, wind difference data and Lifting Condensation Level (LCL) data.

3. The computer system of claim 1, where the processor displays the composite tornado potential index on a map.

4. The system of claim 1 where at least one tornado indicator data is generated by the processor from tornado indicator data directly received from the meteorological data source.

5. A system that predicts current tornado activity comprising:
   a. a processor that receives meteorological model data from a meteorological data source;
   b. means for generating a model data tornado potential index by the processor, based on meteorological model data that indicates tornadic activity, where the meteorological model data comprises a plurality of tornado indicator data, and the model data tornado potential index is generated by combining weighted values for selected tornado indicator data;
   c. means for generating a radar data tornado potential index by the processor, based on radar data indicative of tornadic activity, where the components of said radar data comprise, a tornado vortex signature (TVS) data value, a mesocyclonic activity (MESO) data value, a precipitation and intensity (dBz) data value, a vertically integrated liquid (VIL) data value, and hail size data value, and where the radar data tornado potential index is generated by combining weighted values of selected radar data;
   d. means for generating a composite tornado potential index by the processor, based on the model data tornado potential index and the radar data tornado potential index; and
   e. means for overlaying the composite tornado potential index on a map by the processor.

6. The system of claim 5 where the selected tornado indicator data comprises at least two of:
   (i) convective available potential energy (CAPE);
   (ii) Convective Inhibition (CIN);

(iii) helicity data;
(iv) wind difference data; and
(v) Lifting Condensation Level (LCL) data.

\* \* \* \* \*